Figure 1:
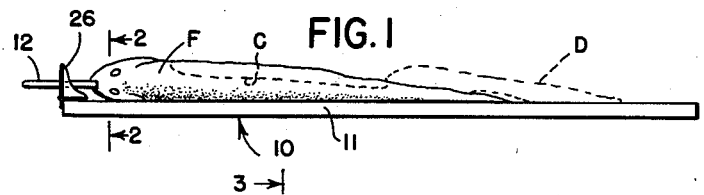

July 31, 1962 R. E. YOUNG 3,046,596
FISH AND ANIMAL HOLDING AND MANIPULATING DEVICE
Filed Aug. 8, 1960

INVENTOR.
RALPH E. YOUNG
BY
*Williamson & Palmatier*
ATTORNEYS

United States Patent Office 3,046,596
Patented July 31, 1962

3,046,596
FISH AND ANIMAL HOLDING AND
MANIPULATING DEVICE
Ralph E. Young, Hutchinson, Minn., assignor of one-half to D. O. Comer, Hutchinson, Minn.
Filed Aug. 8, 1960, Ser. No. 48,086
2 Claims. (Cl. 17—8)

This invention relates to an apparatus for holding and manipulating fish and animals while being cleaned. The object of my invention is to provide a new and improved fish and animal holding device of simple and inexpensive construction and operation.

Another object of my invention is the provision of a novel apparatus for holding fish and animals and in a plurality of positions in order to facilitate ready and easy cleaning thereof.

Still another object of my invention is to provide a novel and improved apparatus for securely clamping fish or animals by means of cooperating spring loaded toothed jaws, the operating handles of which are protected from splattering of blood, scales, hair and the like so as to minimize the possibility of a person's hands slipping on the handles when the fish or animal is being applied to or removed from the jaws.

The further object of my invention is to provide an improved apparatus which is readily adapted for securely holding and manipulating fish and animals of any of a plurality of various sizes in order to facilitate cleaning thereof.

A still further object of my invention is the provision of a new and novel fish and game clamping apparatus employing spring loaded jaws arranged with their operating handles such that the fish or animal being cleaned need not be lifted in order to operate the handles and jaws.

Figure 2:
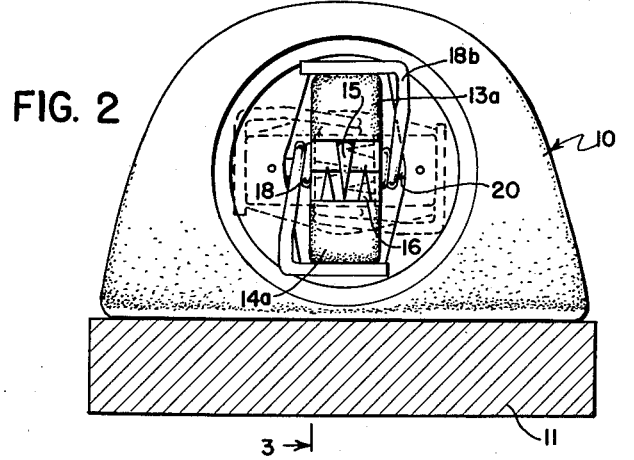
Figure 3:
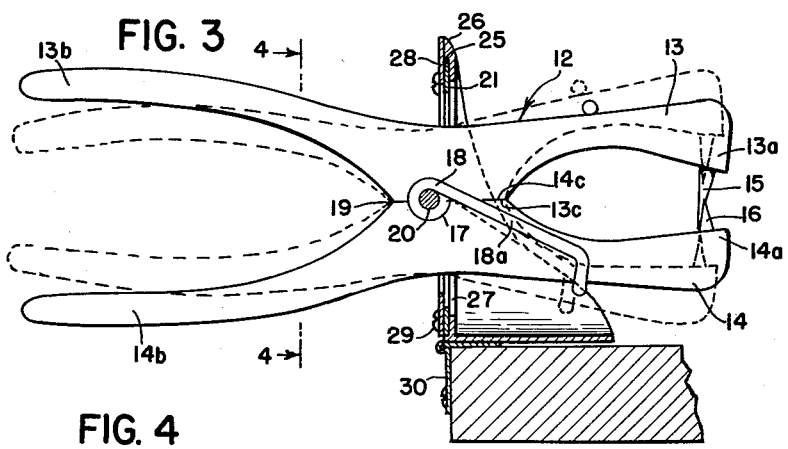
Figure 4:
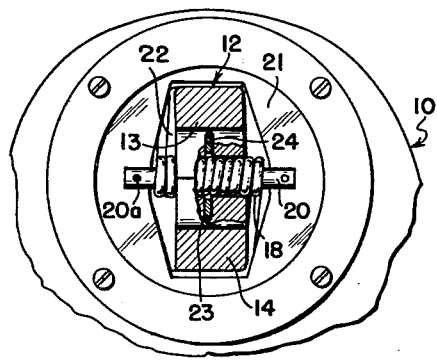

These and other objects and advantages of my invention will more fully appear from the following description, made in connection with the accompanying drawings, wherein like reference characters refer to the same or similar parts throughout the several views, and in which:

FIG. 1 is a side elevation view of the invention;
FIG. 2 is an enlarged section view taken as indicated at 2—2 in FIG. 1;
FIG. 3 is an enlarged detailed section view taken as indicated at 3—3 in FIG. 2;
FIG. 4 is a detailed section view taken as indicated at 4—4 in FIG. 3.

One form of the present invention is shown in the drawings and is described herein.

The fish and animal holding and manipulating apparatus is indicated in general by numeral 10 and includes an elongate base 11 which may be constructed of wood, and a clamping device 12, and a frame member 26 mounting the clamping device on the base.

The clamping device 12 includes a pair of elongate and juxtaposed jaw members 13 and 14 having clamping jaws 13a and 14a at corresponding ends thereof and also having cooperating handles 13b and 14b at the other ends. The jaw 13a is provided with an elongate pointed spike or tooth 15 which extends toward and engages jaw 14a. The jaw 14a is provided with a pair of pointed spikes or teeth 16 on opposite sides of the spike 15 and extending toward but into spaced relation with jaw 13a. The jaw members 13 and 14 have abutting surfaces 13c and 14c which are recessed at 17 to receive and cradle a coil spring 18, the opposite end portions 18a and 18b of which respectively lie along the sides and outside edges of jaw members 13 and 14 for holding the same together and to continuously urge the jaws 13a and 14a one toward the other. The rearmost portions of surfaces 13c and 14c define the fulcrum at 19 between the jaw members 13 and 14 so as to cause the jaw members to assume the position shown in dotted lines when the jaws are swung apart.

A crossbar or pivot 20 extends through the center of the spring 18 and the ends of the bar 20 are affixed as by rivets 20a to a rotatable disc 21 which has an enlarged opening 22 in the center thereof of such size as to receive the clamping device 12 therethrough. In the form shown the opening 22 is generally hexagonal in shape. As best seen in FIG. 4 the jaw members 13 and 14 are slotted at 23 adjacent the recesses 17 and an annular disc or washer 24 fits in the slots 23 in surrounding relation with the spring 18 for maintaining the jaw members 13 and 14 in alignment with each other.

The disc 21 lies in an annular recess 25 in the generally upright frame member 26 which has a circular opening 27 in the upright portion thereof to receive the clamping device 12 therethrough. The disc 21 is slightly smaller in diameter than the recess 25 to permit the disc to readily revolve or rotate. An annular retaining plate 28 is affixed in overlying relation with the disc 21 by means of screws 29.

The frame member 26 is secured to the base 11 by means of a hinge which is oriented so that the axis of swinging extends generally transversely of the elongate clamping device 12.

It should be understood that the hinge 30 may alternatively be secured to some other type of base such as a common C-clamp so that the apparatus may be removeably attached to a worktable. The hinge 30 would in any event be used to connect the frame member to the base regardless of the exact form of the base.

In use, the fish F will be laid on the base 11 and the jaws 13a and 14a will be opened to cause the spikes 15 and 16 to pierce one portion of the fish's body or another. In the use depicted in FIG. 1, the spikes 15 and 16 are inserted behind the tough gristle or bone immediately adjacent the lips of the fish. In this arrangement, the fish may be filleted by producing a cut at the dotted line C rearwardly along the fish's body but without severing the fillet. The fillet is then flopped over longitudinally as shown by the dotted line D and the fillet may then be easily separated from the skin. When this has been accomplished the fish F will be flopped over by merely gripping the handles and turning the fish over, and it may be necessary to simultaneously swing the frame member 26 slightly to compensate for the size of the fish. The other side of the fish will then be similarly filleted and the fillet will be skinned.

In other instances it may be desirable to clamp the tail of the fish so that the fish may be scaled. Here again, the fish may be easily turned over when work on one side of the fish has been completed. Without changing the hold on the fish, it may be laid on its back and be gutted. It will be understood that throughout these operations of filleting, skinning, scaling, gutting, etc. the handle portions 13b and 14b are protected from splattering of blood and scales and the slime by the upright frame member 26 so that when the handles are again gripped to open the jaws there is practically no likelihood that the person's hands will slip off the handles which could well cause pinching of the person's other hand as he removes the fish's head or tail from the jaws.

In a similar fashion, the apparatus 10 may be employed in skinning an animal such as a squirrel. The jaws will be clamped on to the hind legs and then the animal may be oriented so that skinning may proceed from the tail forwardly over the head. Likewise the animal or squirrel may be reversed in a subsequent operation to skin the hind legs, and of course the squirrel may be easily held in proper position for gutting.

It will, of course, be understood that various changes may be made in the form, detail, arrangement and proportion of the parts without departing from the scope of my invention which consists of the matter described herein and set forth in the appended claims.

What I claim is:

1. A fish and animal clamping device comprising a base, an upright frame member having a horizontal opening therethrough, a pivot means below said opening and mounting said frame member on the base for tilting movement, a pair of elongate horizontally oriented swingable jaw members with cooperating jaws and handles at opposite ends thereof and extending generally transversely of the axis of said pivot means, means securing said jaw members together and resiliently urging said jaws one toward the other, said jaw members having means defining a fulcrum intermediate said jaws and handles and permitting swinging of the jaw members about an axis generally transversely of the jaw members, said jaw members extending transversely of the tilt axis of said pivot means and extending horizontally through the opening in said frame member with the jaws disposed on one side of the frame member and the handles disposed at the other side of the frame member and having said fulcrum in closely spaced relation with the frame member, and a mounting member carrying said jaw members and being rotatably mounted on the frame member about an axis extending longitudinally of the jaw members.

2. A fish and animal clamping device comprising a base, an upright frame having fore-and-aft sides and having a horizontal opening between said fore-and-aft sides, a pivot means mounting said frame member on the base for rearward tilting movement, the frame having means preventing forward tilting thereof, a pair of elongate horizontally oriented swingable jaw members with cooperating jaws and handles at the opposite ends thereof, means securing said jaw members together and resiliently urging said jaws one towards the other, said jaw members having means defining a fulcrum intermediate said jaws and handles, said jaw members extending horizontally through the opening in the frame member with the jaws disposed forwardly of the frame member and the handles disposed rearwardly of the frame member with said fulcrum being disposed closely adjacent the frame member, a pivot element mounting said jaw members for tilting movement about an axis substantially parallel to said fulcrum, and means mounting said pivot element and being rotatably mounted on the frame member for movement about an axis extending generally longitudinally of the jaw members.

References Cited in the file of this patent

UNITED STATES PATENTS

| | | |
|---|---|---|
| 549,333 | Smith | Nov. 5, 1895 |
| 2,686,334 | Miller | Aug. 17, 1954 |
| 2,980,948 | McCain | Apr. 25, 1961 |